United States Patent
Geering

(10) Patent No.: US 11,138,484 B2
(45) Date of Patent: Oct. 5, 2021

(54) COLORED REGION BARCODE PRINTING

(71) Applicant: TOSHIBA TEC KABUSHIKI KAISHA, Tokyo (JP)

(72) Inventor: David L. Geering, Epping (AU)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/861,635

(22) Filed: Apr. 29, 2020

(65) Prior Publication Data
US 2020/0265279 A1 Aug. 20, 2020

Related U.S. Application Data

(63) Continuation of application No. 16/279,833, filed on Feb. 19, 2019, now abandoned.

(51) Int. Cl.
*G06K 19/06* (2006.01)
*G06K 19/07* (2006.01)

(52) U.S. Cl.
CPC ... *G06K 19/0614* (2013.01); *G06K 19/06103* (2013.01); *G06K 19/0725* (2013.01)

(58) Field of Classification Search
CPC ......... G06K 19/0614; G06K 19/06103; G06K 19/0725; G06K 19/06028; G06F 3/1275; G06F 3/122; G06F 3/1204; G06F 3/1244; G06F 3/1206; G06F 3/1243; G06F 3/125; G06F 3/1285
See application file for complete search history.

(56) References Cited

U.S. PATENT DOCUMENTS

| | | | |
|---|---|---|---|
| 9,240,058 | B1 | 1/2016 | Amacker et al. |
| 2004/0194026 | A1* | 9/2004 | Barrus ............ G06F 16/93 715/201 |
| 2007/0019222 | A1 | 1/2007 | Oda et al. |
| 2007/0176000 | A1 | 8/2007 | Cattrone et al. |
| 2014/0298223 | A1 | 10/2014 | Duong et al. |

FOREIGN PATENT DOCUMENTS

| | | |
|---|---|---|
| EP | 2228751 A2 | 9/2010 |
| JP | 2017-17641 A | 1/2017 |

OTHER PUBLICATIONS

T. Kieninger and A. Dengel, "The HCI Paradigm of HyperPrinting," 2008 The Eighth IAPR International Workshop on Document Analysis Systems, Nara, Japan, 2008, pp. 591-598, doi: 10.1109/DAS.2008.11. (Year: 2008).*
Extended European Search Report dated Jul. 20, 2020 in corresponding European Patent Application No. 20150949.4, 10 pages.

* cited by examiner

*Primary Examiner* — Matthew Mikels
(74) *Attorney, Agent, or Firm* — Kim & Stewart LLP

(57) ABSTRACT

A system for automatically replacing selected content within an electronic document is disclosed. The system includes the superimposition of a geometric shape (e.g. a rectangle) over textual or other human-readable content within an ordinary word processing document that is to be replaced with a barcode or other machine-readable content. Thereafter, a print driver automatically detects the human-readable content underlying the detected geometric shape and converts that into the desired barcode type. Then, the document may be output physically or electronically, now including the barcode in place of the human-readable content.

5 Claims, 7 Drawing Sheets

COLORED REGION BARCODE PRINTING

CROSS-REFERENCE TO RELATED APPLICATION

This application is a continuation of U.S. patent application Ser. No. 16/279,833, filed Feb. 19, 2019, the entire contents of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to bar code and similar special-purpose printers. More specifically, this disclosure offers improvements in the usability of special-purpose printers from desktop based document-oriented software such as traditional word processors.

Description of the Related Art

Currently, utilizing a barcode printer's built-in capabilities to render barcodes is done through bespoke software, or through a more generic label-design software. The bespoke software is software specifically designed for barcode generation, typically created by the barcode printers. Numerous downsides exist for this software. The most obvious being that it requires a specific installation on each and every computer from which barcodes will be or may be printed. Others include that it is generally updated rarely and, over time, often goes out of support. Either the operating system is upgraded at some point such that the barcode software is no longer supported, or the barcode software ceases being upgraded and becomes inoperative. In addition, specialized training and familiarity for users is required in order to operate the barcode software. Though such software is generally not difficult to operate, it can be yet another system that requires training or updating or otherwise is required and if that could be eliminated, it would make IT support staffs jobs, and the user's jobs, simpler. The operation of most barcode software is often convoluted through poor user experience, user interface design, and complicated menus and instructions. The user experience is much less than ideal.

As used herein, "barcode" means a traditional series of vertical lines barcode, a two-dimensional barcode such as a QR code, PDF417 code, DataMatrix code or other, similar two-dimensional barcodes, an RFID (radio frequency identification) tag, or any other type of print that is not human-readable text and appears on, is created on, or superimposed upon a document. Similarly, a "barcode printer" as used herein means either a specialized printing device that prints barcodes or a general printing device (e.g. a multifunction printer or peripheral) that may be instructed to, and is capable of, printing barcodes. The "printing" of a barcode may actually involve writing some text or other content in a machine readable form that may or may not be visible (e.g. writing RFID tags).

In contrast to typical barcode software, virtually every modern computer user is familiar with at least one word processor application. Microsoft® Word® is the most common example, but many other such software exist. However, users of software such as word processors must use external tools to generate barcodes which are then inserted into the document as images. Such tools often include extensions or specialized print drivers that enable the "printing" of barcodes. These external tools are often costly and slow down software and hardware speed. They also require extra training and are not user friendly. And, as discussed above, these tools are often not commonly updated.

One other option is to merely print barcodes (or two-dimensional barcodes such as QR codes) using raster image processing. This is problematic for several reasons. For one, most barcode printers are typically lower in resolution than normal desktop or multifunction printers, and as a result, scaling artifacts can be introduced, reducing the quality and readability of the printed barcode. In some cases, the readability issues are so severe that later computer reading of the barcodes is negatively impacted. These issues may be mitigated through the use of vector based barcode images, however, in the case of either raster or vector barcode images, the printer's built-in capabilities to render clear and precise barcodes is entirely forgone. What is needed is a system that would enable any ordinary printer to generate high quality barcodes with the ease and use of a regular printer.

Figure 1:
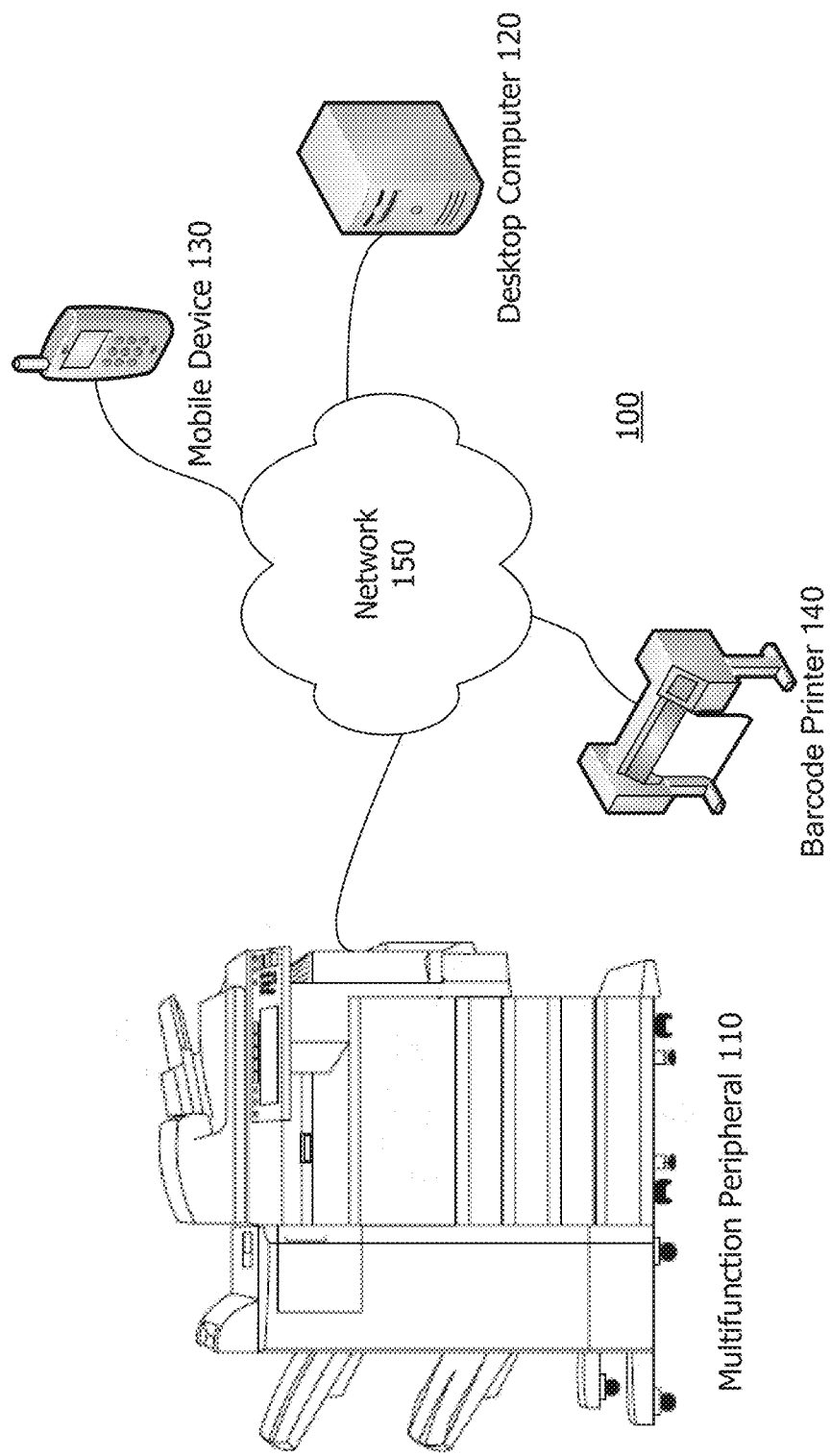
FIG. 1 is an example system for enabling printing of a barcode.

Throughout this description, elements appearing in figures are assigned three-digit reference designators, where the most significant digit is the figure number where the element is introduced, and the two least significant digits are specific to the element. An element that is not described in conjunction with a figure may be presumed to have the same characteristics and function as a previously-described element having the same reference designator.

DETAILED DESCRIPTION

Barcode printers have built-in capabilities for generating numerous different types of barcodes, and many printer models are also capable of encoding information into RFID tags and other non-visual information. Ordinarily this functionality is given to the user through label-design software. However, such software is not suitable for other tasks, such as word processing, or making spreadsheets, or complicated graphical design work. Additionally, such software is highly proprietary, expensive, and taxing on a typical computer's resources.

Conversely word processing and spreadsheet software have become ubiquitous, they can be found on any computer and almost anyone using a computer can use such software with ease. Unfortunately, most word processing software lacks the capability of printing barcodes or interacting with a barcode printer. Additionally, if a software program were outfitted to communicate with a barcode printer, the additional code required tends to make such software programs operate more slowly and less-responsively.

A workaround to this issue is to insert barcodes (e.g. two-dimensional barcodes such as QR codes) into the document itself as images. This solution is not ideal because if a barcode printer is used to print such documents, the printer's barcode printing capabilities are not utilized. Further, resolution is often lost rendering some barcodes unusable (e.g. unscannable by barcode scanners). Additionally, some print-like functions such as RFID tag encoding simply cannot be performed this way. Barcode printers also often have low data communication rates and sending the data of a barcode image to the printer can be substantially slower than simply sending a command to the barcode printer to generate the barcode.

With few exceptions, barcode printers are monochrome devices. Printing color documents to a barcode printer is not a typical use case. Since colors are not typically used in documents destined to be printed via a barcode printer, colors can instead be given special meaning to the barcode printer driver.

This disclosure overcomes issues with the prior art by allowing the user to not only visualize the placement and size of a barcode, but also know the content of the barcode before the document is printed. The user can rely upon software with which he or she is already very familiar and use functionalities (like inserting geometric shapes) that are relatively easy to add, adjust, and see. Thus, the user can know the content that will be the subject of the action within that geometric shape and doing so relies upon well-known techniques and user interfaces. Additionally, the disclosure teaches utilization of the printer's built-in capabilities to render barcodes, ensuring the best possible barcode quality.

Description of Apparatus

Figure 3:
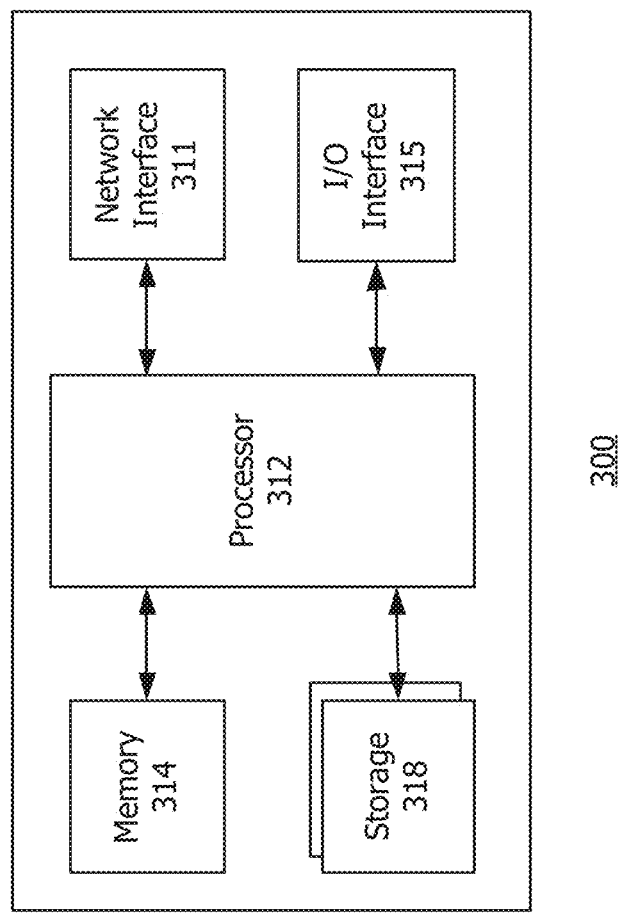
FIG. 3 is a block diagram of a computing device.

Referring now to FIG. 1, is an example system 100 for enabling printing of a barcode. The system 100 includes a multifunction peripheral 110, a desktop computer 120, and mobile device 130, and a barcode printer 140, all interconnected by a network 150. The multifunction peripheral 110, desktop computer 120, and mobile device 130 are examples of computing devices (FIG. 3).

The multifunction peripheral 110 is a traditional printing device that may include other functions such as scanning, transmitting and/or receiving facsimiles, optical character recognition functions, transmitting and/or receiving email, or other functions. The multifunction peripheral may include a rather simple user interface for basic commands regarding the above functions or, in some cases, may be essentially another computing device that is capable of performing the functions described herein with respect to the computing devices, including the desktop computer 120 and the mobile device 130. As discussed further herein, the multifunction peripheral 110 may simply output documents and/or barcodes created by the mobile device 130 and desktop computer 120, or may also generate or be used to generate barcodes as described herein in addition to outputting them once that process is complete. In that sense, the multifunction peripheral may operate both as a computing device and as an output device.

The desktop computer 120 is a computing device as described below. The desktop computer may incorporate word processing software, along with other software and functionality, that enable the desktop computer 120 to operate as described herein to identify text for conversion into barcodes. The desktop computer may communicate with printing devices, such as the multifunction peripheral 110 and the barcode printer 140 using the network 150. Though shown as a "desktop" computer, this desktop computer 120 may be a laptop, tablet, or other similar device capable of using word processing software and outputting to a printing device.

The mobile device 130 is a computing device as discussed more fully below. The mobile device 130 is intended to be representative of so-called smart phones which may also operate as disclosed herein to label textual content for outputting via barcode printer 140 or multifunction peripheral 110 as a barcode.

The barcode printer 140 may be specialized hardware that only, or primarily, prints barcodes (as defined above). This may be an actual printer of barcodes, but it may also be a QR code printer, an RFID label printer, or some other similar form of machine-readable content that may be affixed to or integrated into a printed document or physical object (e.g. a box).

The network 150 may be or include the internet, but is primarily used as a communications system for enabling the various components of the system 100 to communicate with one another.

Figure 2:
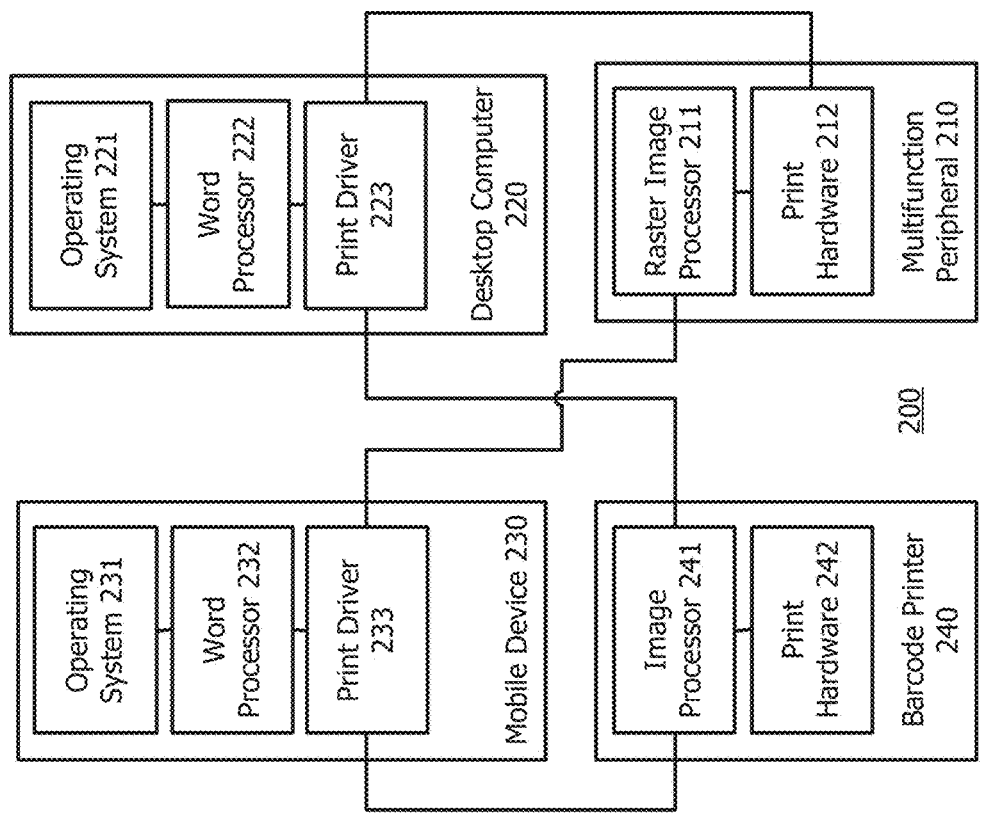
FIG. 2 is a block diagram of the system for enabling printing of a barcode.

FIG. 2 is a block diagram of the system 200 for enabling printing of a barcode. The system 200 includes the same multifunction peripheral 210, desktop computer 220, mobile device 230, and barcode printer 240 of FIG. 1. This figure is intentionally simplified to focus only on those elements that are most relevant to this disclosure. As a result, components or functions have been omitted that may or may not be present in each element of this system 200.

The multifunction peripheral 210 includes, at least, a raster image processor 211 and print hardware 212. The raster image processor 211 converts print jobs into visible images that are output on physical documents. The raster image processor 211 is described as a raster image processor 211, but in some cases may include specialized image processing capabilities, particularly in cases in which the multifunction peripheral 210 includes the capability to print other types of barcodes or encode information in RFID tags.

The multifunction peripheral 210 also includes print hardware 212 that is physical hardware responsible for outputting physical documents and/or barcodes once the raster image processor 211 has converted any printer language document received into printing instructions for the print hardware 212. The print hardware may include traditional printing hardware, as well as any specialized hardware (e.g. RFID tag encoding hardware).

The barcode printer 240 also includes an image processor 241 and print hardware 242. The barcode printer 240 is, preferably, a specialized printer suitable for printing a barcode or encoding non-visual information. As discussed above, a barcode may be an actual barcode, but may take other forms, such as RFID tag encoding. Traditionally, specialized barcode printer software on a computing device was required to interface with the barcode printer 240 so as to output barcodes.

The image processor 241 performs much the same processes as the raster image processor 211, but the printer language may be distinct and special given that this is a barcode printer 240. Likewise, the image processor 241 receives print jobs and outputs those jobs to the print hardware 242 so that a barcode may be printed.

The desktop computer 220 and mobile device 230 each include an operating system 221, 231; a word processor 222, 232; and a print driver 223, 233. Both the desktop computer 220 and the mobile device 230 are shown only to indicate that both are possible. As discussed above, the multifunction peripheral may include these components as well in some cases.

The operating system 221, 231 manages the base level operations of the desktop computer 220 and the mobile device 230. The word processor 222, 232 is a typical software application that is used to input, organize, and arrange words, typically for consumption in textual documents. Microsoft® Word® is the most common word processor. Though described as a word processor application, in some cases, the word processor 222, 232 may actually be a different type of application, such as a spreadsheet application, a publishing application (e.g. Adobe® Reader®), or a presentation application (e.g. Microsoft® PowerPoint®). However, the primary distinction for these applications is that they all rely upon a traditional, typical print driver 223, 233. They do not rely upon specialized software applications that are used specifically to generate barcodes or to enable printing by a barcode printer.

Finally, the printer drivers 223, 233 are software that enables the word processor 222, 232 to output documents for printing. The printer drivers 223, 233 may include detection capabilities to recognize portions of the text and images within the documents generated by the word processor as will be described more fully below.

Turning now to FIG. 3, a block diagram of a computing device is shown. The computing device 300 may be representative of the server computers, client devices, mobile devices and other computing devices discussed herein. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 may have a processor 312 coupled to a memory 314, storage 318, a network interface 311 and an I/O interface 315. The processor may be or include one or more microprocessors and application specific integrated circuits (ASICs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312. As used herein, the word memory specifically excludes transitory medium such as signals and propagating waveforms.

The storage 318 may provide non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage. As used herein, the word storage specifically excludes transitory medium such as signals and propagating waveforms.

The network interface 311 may be configured to interface to a network such as network 150 (FIG. 1).

The I/O interface 315 may be configured to interface the processor 312 to peripherals (not shown) such as displays, keyboards and USB devices.

Description of Processes

Figure 4:
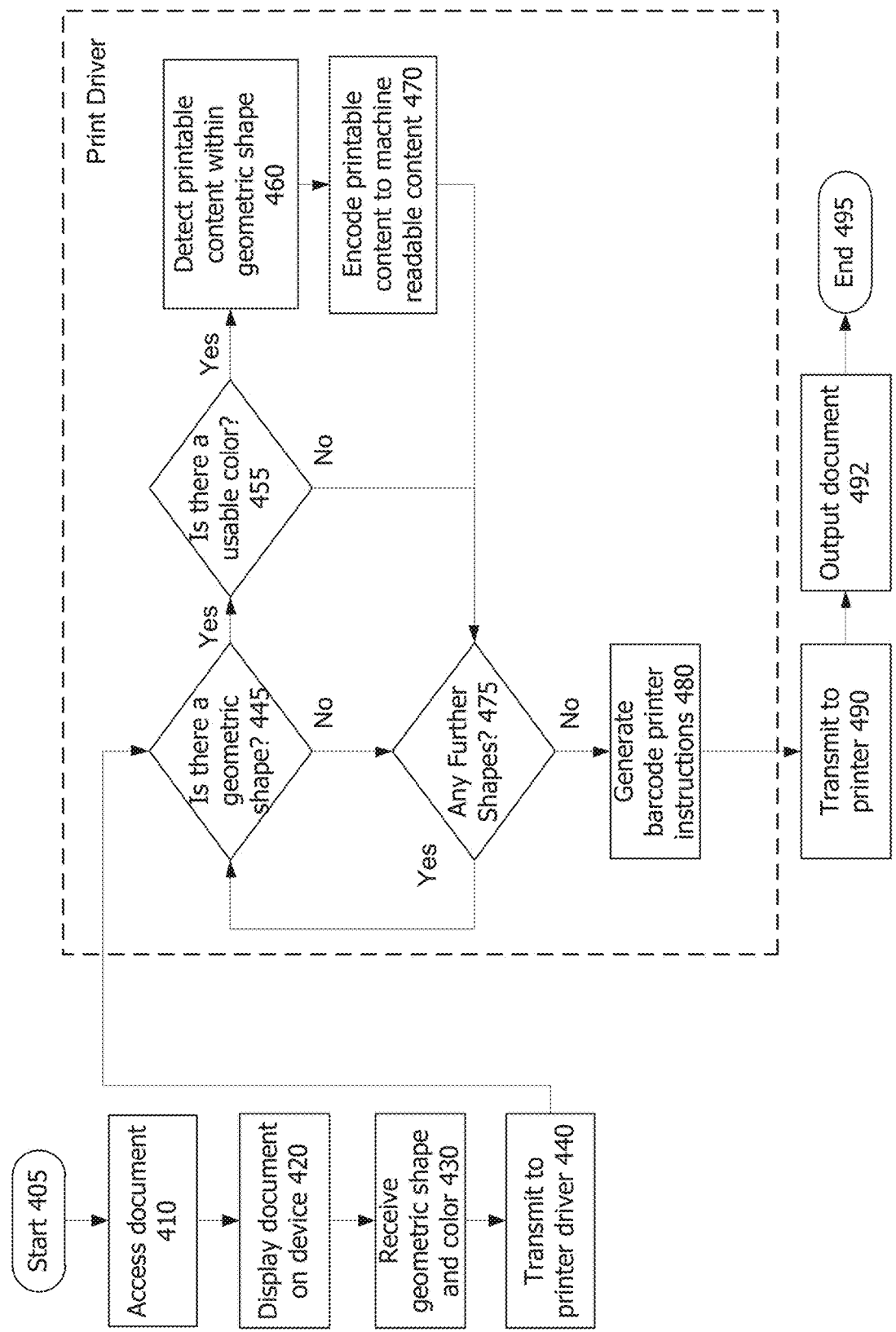
FIG. 4 is a flowchart of a process for converting visible text into a barcode.

FIG. 4 is a flowchart of a process for converting visible text into a barcode. The process begins with the start 405 and ends at end 495. The process may take place many times in a given document before it is transmitted to the printer at 490 (as discussed below).

Following the start 405, a user first accesses a document at 410. The user may access a document using the desktop computer 220 (for example) or the mobile device 230, or some other computing device. This access will typically entail opening a document or otherwise beginning the process of editing a document using software. Preferably, this software is software with which the user is familiar, such as a typical word processing software.

Next at 420, the document is displayed on a display of the device. The display may be connected to or otherwise visible to a user. The display makes the document visible to a user so that the user may interact with it, for example, by editing a document, adding text to the document, or otherwise formatting a document.

Figure 5:
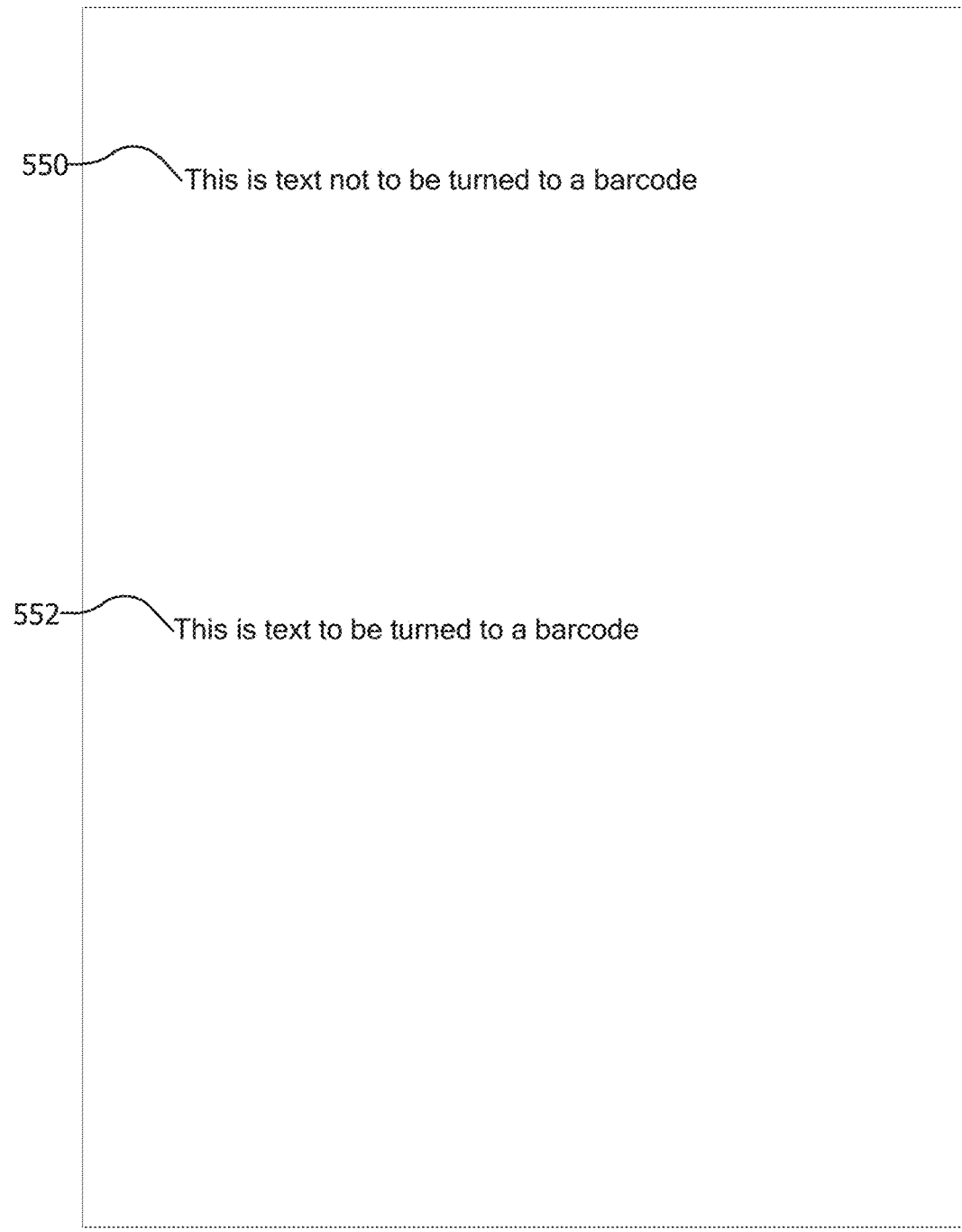
FIG. 5 is an example document in which some of the text is to be converted into a barcode.

An example of an opened document appears in FIG. 5. There is text 550 for which a barcode will not be created and text 552 for which a barcode will be created. The process is discussed more fully below.

Returning to FIG. 4, a user of the software may draw a geometric shape over or on top of the document, which may or may not be in a particular color at 430. The color may be important to enable the printer driver to more-easily recognize the portion of the document for which a barcode will be created for the printing device.

Figure 6:
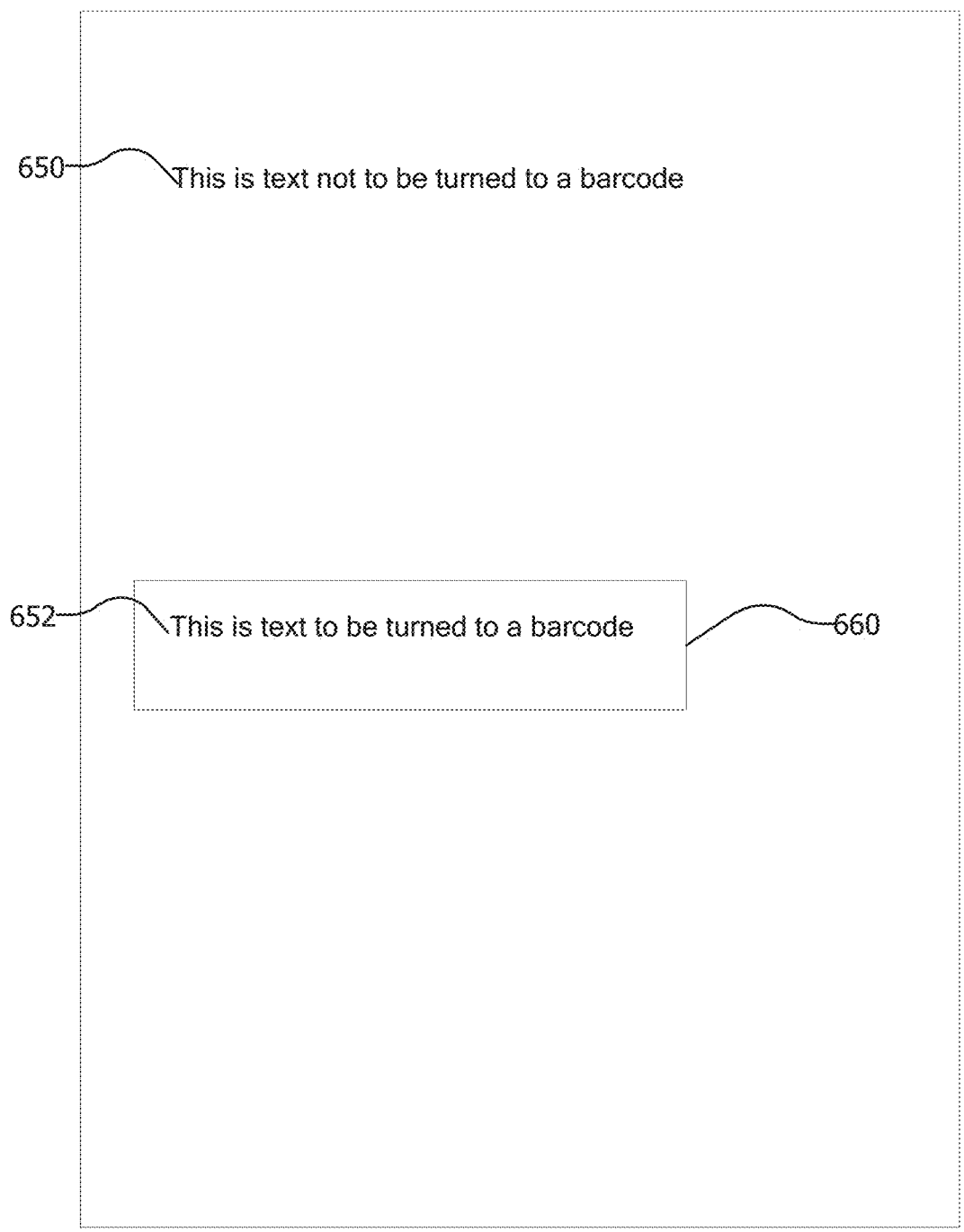
FIG. 6 is an example document having a geometric shape with color added over some of the text.

An example of such a document appears in FIG. 6. Here, the same text 650 for which a barcode will not be created remains visible, but now there is a geometric shape (in this case a rectangle) superimposed over the text 652 which will be converted into a barcode. Importantly, this geometric shape 660 was drawn using the geometric shape drawing functionality inherent in the word processing application. Though not shown, the interior of the geometric shape 660 may be colored a particular color such as red, green, yellow or some other color. Preferably, the shape or color would appear behind the text or be translucent, and generally would not be the same color as the text, because text would not be visible to a human behind that shape. However, even colors corresponding to the text, including a black shape over black text, may be used if necessary because the textual content behind the shape will always be readable to the computer and print driver so long as it is stored in the associated file type.

For some types of software (e.g. PDF viewers) the data for the document is saved merely as an image. In those types of software, a translucent overlay, relative to the text, may be required because the print driver may be required to perform optical character recognition ("OCR") for the text behind the shape. If the print driver is unable to "see" the text at all, because the shape completely covers the text, then OCR will be impossible, and the desired text to barcode conversion will not function.

More typically, for example, a user may open a document in Microsoft® Word®. The user may then use the insert shape function to draw a shape on the document. Alternatively, if a user uses Adobe® Reader®, he or she may use the tool function to insert an image or a geometric shape. The program a user uses is not particularly important, so long as the program has a capability of allowing a user to insert a geometric shape with a particular color.

The process by which the shape is drawn may take many forms. For example, a user may use a tool to create a series of joined lines, or they may use a tool provided by the software for drawing preset geometric shapes such as a hexagon or parallelogram.

In each case, the associated software (e.g. word processing software, PDF viewer software, spreadsheet software) will interpret actions by the user to draw "shapes" as overlays on top of existing documents or portions of text within documents, and will translate that information into information, along with the print driver, suitable for instructing a print device to output that color and shape in the location on the associated document generated through that user action. The print driver may, in turn, translate it further into an indication by the user of a desire to convert the underlying text into a barcode, as discussed herein.

Geometric shapes may be simple or complex. A user may draw a rectangle of a particular height and width and the software may be preprogrammed to understand that such dimensions are associated with adding a barcode. Additionally, specific colors may be used to define whether or not a barcode should be placed. For example, if a geometric shape is particularly large or particularly small, it may be ignored. Likewise, specific geometric shapes may be required (e.g. the system may only recognize rectangles and squares and may ignore circles and triangles). In other cases, all types of shapes may be recognized.

In still other cases, particular shapes may indicate particular actions to take place (e.g. rectangles may mean that a barcode should be created, but trapezoids may indicate that a QR code should be created from the underlying text). Alternatively, different colored rectangles or squares may indicate different types of codes (e.g. red is a barcode, green is a QR code). Likewise, color-coding may be used to indicate print parameters or other characteristics of the barcodes themselves. So, for example, a green rectangle may mean that a barcode should be printed with as low a resolution (e.g. 75 dpi) as possible, while a red rectangle may be an intermediate resolution (e.g. 300 dpi) and a blue rectangle may mean as high a resolution as possible (e.g. 2400 dpi). Still more simply, occasionally barcodes (e.g. QR codes) can rely upon or use colors as a part of their encoding. Certain colors of the geometric shapes may indicate that color QR codes should be used while other colors may indicate that only black and white QR codes should be used.

Alternatively, the particular actions to take place may be based on the associated text itself. For example, RFID tags can encode thousands of bytes of data, which cannot easily be placed within a geometric shape due to limitations such as font size or available space in the document. Therefore, the associated text may represent a resource (such as the name of a file) which the printer driver could read in and treat as the data to encode into the RFID tag.

Alternatively, the particular actions to take place may be actions other than barcode generation for the associated text. For example, a blue colored region with an email address inside may be detected and may instruct the print driver to email the document to the email address within the colored region. Still further complex versions of this may involve emailing a barcode of converted text in a red colored region to the email address in the blue colored region. Or, storing the document in a location identified either within a colored region or merely associated with a particular colored region in which the instruction to store the document is associated (e.g. a red color, with or without any text within it, may indicate that the document should be stored on a particular cloud storage service or network location).

The use of particular colors or geometric shapes could indicate different actions to take place. Those actions could include sending the text, or the document, or a barcode generated from the same another portion of text, to an email address, a facsimile number, a cloud storage service, or network storage device or location. The transmitted document may be the original document, a document bearing a barcode from converted text, as described herein, or simply the barcode itself, created from the colored region on the document.

Similarly, color coding may perform the same function. For example, all "blue" geometric shapes may be for barcodes, while "yellow" geometric shapes may be for QR code generation, while all "red" geometric shapes may be for RFID tag creation. The associated color definition may be either broad or specific. In some instances, a specific color with a specific designation may be required before it will be recognized. For example, if the print driver associates a color (e.g. red, which is represented hexadecimally as "#FF0000") in the form of a rectangle for creation of a barcode, then one will only be created by an associated printer if the right geometric shape with the same color ("#FF0000") is drawn by a user.

In other instances, a range of colors may be appropriate. For example, instead of only Hex Code # FF0000 indicating a requirement for barcode generation, any shade or a limited (predetermined) spectrum of red may designate a barcode needing to be drawn. In other instances, more than one color or geometric shape may be selected to indicate a barcode. For example, a geometric shape that is either orange or green may be selected. And, all of these settings may be configured by a user or administrator.

When a user is finished modifying a document to add the desired geometric shapes and associated colors the document may be transmitted to the print driver at 440.

Returning to FIG. 4, the print driver performs several tasks. First at 445, the driver determines whether there is a geometric shape within the document. Detection of geometric shapes may be accomplished in several ways. In the case of rectangles, the print driver may determine that a set of points define vectors that are "straight" (within a detected tolerance) with respect to one another. Alternatively, the printer driver may detect that each of two sets of lines within a certain range on a given page are parallel to one another (e.g. the left and right sides and the top and bottom sides, respectively). Again, the system may allow for some range of tolerance so that absolute exact parallel lines are not required. Rectangles are particularly useful because they are among the most easily detected shapes. They have a regular shape with two sets of parallel lines and an interior filled within those lines. In some cases, the print driver language itself defines print operations in terms of lines, so, for example, detection of two horizontal lines in successive lines of a printed document can be quite simple for a print driver. In the cases of other shapes, different detection methods may be employed.

If no geometric shape is detected ("no" at 445), then the process goes to 475 to determine if any further shapes are present. If there is a geometric shape detected ("yes" at 445), then the process moves on to determine if there is a usable color at 455.

At 455, the printer driver determines whether there is a usable color within the geometric shape. The determination of the presence of a proper color can be accomplished in several ways. To simplify the detection of colored regions at 455, colors may be quantized. Specifically, colors may be given ranges or tolerances. This limits the number of configurable colors to the user, but also reduces confusion by preventing similar colors from being used for different purposes.

The quantization may take place in many forms, but one form that has been found to work for this process translates approximate detected colors into "angles" along a 360 degree arc. Thus, the detected geometric shape's color (which may originate as an RGB or CMYK color for example) is first transformed into the HSV (Hue, Saturation, Value) color model. In this model, the hue must be close to a multiple of 30 degrees, and the saturation and value must be close to 100%. These tolerances can be adjusted by the user, but generally speaking, default tolerances of ±5 degrees for hue and up to 5% for saturation and value are suitable for most situations. This process of quantization means that there are twelve distinct usable hues. With full saturation and value, these colors are traditionally named so: Red (0 degrees), Orange (30 degrees), Yellow (60 degrees), Chartreuse (90 degrees), Green (120 degrees), Spring green (150 degrees), Cyan (180 degrees), Azure (210 degrees), Blue (240 degrees), Violet (270 degrees), Magenta (300 degrees), Rose (330 degrees).

It should be apparent that other quantization systems could be used, but this one tends to provide sufficient ranges of leeway between the various hues, and still enables a suitable level of accuracy for the system to function with reliability in converting text to barcodes.

If there is no usable color detected by the print driver ("no" at 455), then the document passes to 475. However, if there is a usable color ("yes" at 455), then the print driver detects printable content within the geometric shape at 460. This printable content can be any information that is able to be expressed in a barcode such as text, hyperlinks, pictures, images, audio files and the like. The print driver attempts to capture all content within the detected shape, but in some cases, some information may be too large to present in a single barcode or may remain undetected or indecipherable to the software. If the information is too large, it may be split in to multiple barcodes or truncated. Undetected and indecipherable content will almost certainly be omitted.

In addition to capturing the text at 460, any formatting of the text (e.g. the angle, such as 0, 90, 180, or 270 degrees, relative to the document, that the text is placed at, and in some cases, any bolding or highlighting or italics, or underlines, etc.) is also recorded. If text is placed at more than one angle within the matched geometric figure, only the last angle may be stored. In more complex systems, all textual formatting may be represented and stored within the barcode information. Most printing systems allow transforming the coordinate space through affine transformations. The most common types of transformations include translation, scaling, and rotation. Transformations are typically done by concatenating transformation matrices. Printer drivers often use a transformation matrix in order to map coordinates in the printing system's coordinate space to the device's coordinate space. This information may be represented, to the extent the software enables doing so, within the resulting barcode. These types of transformations may alter the angle and format of the detected text (e.g. italics, at a 90 degree angle, relative to the page).

Detecting the current angle of rotation as something will appear on the page, θ, can be done by multiplying two points against the current device and printing system transformation matrices and then obtaining the inverse tangent of the ratio of the two calculated projective coordinates. Below is an algorithm for determining the current angle of rotation, where $T_d$ represents the current device transformation matrix and $T_c$ represents the current printing system transformation matrix.

$$\text{Let } \begin{bmatrix} a \\ b \\ c \end{bmatrix} = T_d * T_c * \begin{bmatrix} 0 \\ 0 \\ 1 \end{bmatrix} \text{ and}$$

$$\begin{bmatrix} d \\ e \\ f \end{bmatrix} = T_d * T_c * \begin{bmatrix} 1 \\ 0 \\ 1 \end{bmatrix}$$

$$\theta = \tan^{-1}\left(\frac{d-a}{e-b}\right)$$

This will successfully detect the angle of rotation for the identified text within the geometric shape even after translation and isotropic scaling may have been applied. Other (much less common) affine transformations such as shearing and anisotropic scaling will affect the accuracy of this calculation. A user-configurable tolerance defaulting to ±5 degrees will allow for rounding errors, which are likely to occur after successive matrix concatenation with IEEE 754 floating point arithmetic.

Depending on the capabilities of the barcode printer, if the rounded angle of the text detected at 460 is not at 0, 90, 180 or 270 degrees, it may be discarded, because most barcode printers are not capable of printing barcodes at any other angles.

Once the printable content, and its angle, is detected, that content is encoded into a barcode at 470. The barcode for that printable content will be presented at the same angle, and with as much of the associated formatting information as is possible given the limitations of the particular barcode printer.

The process may repeat ("yes" at 475), so long as there are other geometric shapes within the document.

Once all matched geometric figures are processed ("no" at 475), barcodes are generated at 480. The angle of the barcode shall be the same as the angle determined before. Certain barcode printers may only be able to produce barcodes at discrete sizes. The size of the barcode will be the largest size supported by the barcode printer that is equal to or smaller than the size of the corresponding matched geometric shape. The barcode is preferably positioned on the page at the location detected at 460, and if it is smaller than the size of the geometric figure, it is centered both vertically and horizontally within the area of the detected geometric shape. In this way, the barcode will effectively "replace" the associated text that was within the geometric shape.

In some instances, a custom setting such as align left or align right of where the geometric figure was may be preprogrammed by the user, an administrator, or be a setting of the barcode printer.

The data encoded in the barcode at 480 shall be barcode content that is representative of the text detected at 460 and encoded at 470. If there are no suitable characters (e.g. the text was illegible, nonsense, or otherwise unprocessable by the printer driver) after encoding at 470, a default or error image may be printed instead of a barcode in the same place as the detected geometric figure. The default or error image may indicate to the user that the associated text was not suitable for barcode generation. In other instances, no image may print at all and the portion may appear either as the inserted, colored geometric shape or as the original text. This may also be a setting set by a user, an administrator, or the printer itself. However, printing a figure may be preferable, because if no barcode prints at all a user may think there is something wrong with the overall function of the barcode printer, rather than that no printable text was detected.

In some cases, standard content or some other visual object may be incorporated into each barcode as the data is encoded. For example, a particular logo, or default content (e.g. a website, a hyperlink, or company name) may be combined with the barcode as it is encoded. The default content may be automatically created, may be set by another color-coded, geometric shape within a document or set of documents (e.g. every time a yellow rectangle is detected, that text may be used as a default portion of a barcode printed such that it appears on each barcode in a set of documents).

Figure 7:
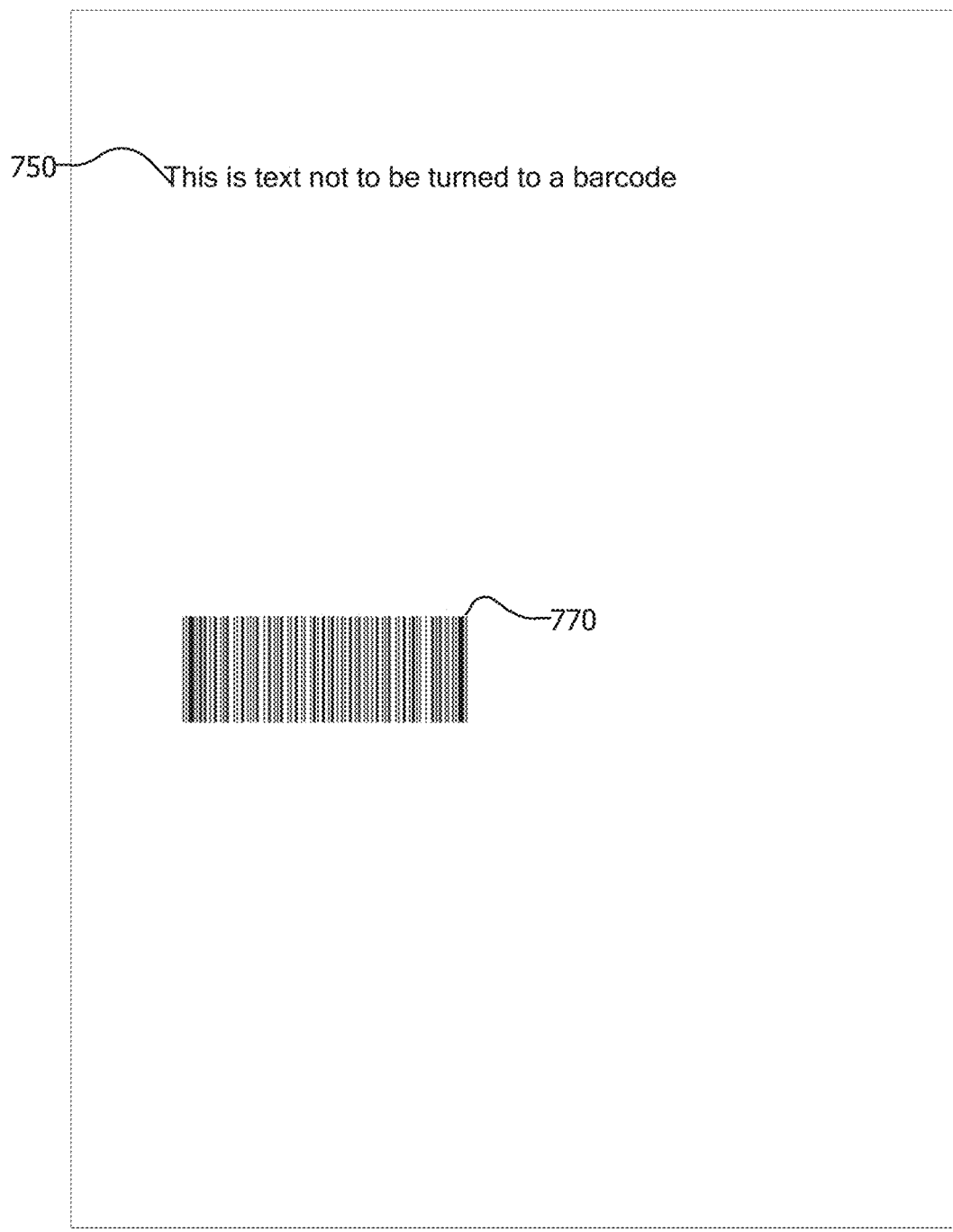
FIG. 7 is an example document with a barcode having replaced some of the text.

At 480, once the geometric shape is replaced with a barcode, the document is then transmitted to a printer at 490 for output. The printer then outputs the document, including the replaced barcode(s) at 492. A physical document can be printed or a digital file with a barcode can be made. An example of such a document appears in FIG. 7. As can be seen, the same text 750 that will not be replaced with a barcode is visible, but the text 652 (FIG. 6) has now been converted into barcode 770. As discussed above, other forms of barcodes are possible as well.

Thereafter, the process ends at 495.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A computing device that enables automatic replacing of user readable content within an electronic document with machine readable content, comprising:
    a processor configured to:
        retrieve the electronic document that includes the user readable content;
        detect a geometric shape of a particular color included in the electronic document;
        detect a portion of the user readable content of the electronic document provided within the detected geometric shape;
        determine properties of the detected geometric shape and properties of the portion of the user readable content of the electronic document, wherein the determined properties of the detected geometric shape include a first size;
        encode the portion of the user readable content into the machine readable content; and
        generate barcode printing instructions based on the machine readable content, wherein the barcode printing instructions include instructions for a printer to print the electronic document after replacing the portion of the user readable content with the machine readable content based on the determined properties of the detected geometric shape and the determined properties of the portion of the user readable content of the electronic document, and wherein the machine readable content is instructed to be a second size that is the largest size, within the first size, supported by the printer.

2. The computing device according to claim 1, wherein the determined properties of the detected geometric shape include a position of the detected geometric shape on the electronic document, and the machine readable content is instructed to be at the position of the detected geometric shape, and
    wherein if the second size is smaller than the first size, the machine readable content is instructed to be centered with respect to the detected geometric shape both vertically and horizontally.

3. The computing device according to claim 1, wherein the determined properties of the portion of the user readable content include an angle of rotation of the portion of the user readable content, and the machine readable content is instructed to be printed to have the angle of rotation of the portion of the user readable content.

4. A method of automatically replacing user readable content within an electronic document with machine readable content, the method comprising:
    retrieving the electronic document that includes the user readable content;
    detecting a geometric shape of a particular color included in the electronic document;
    detecting a portion of the user readable content of the electronic document provided within the detected geometric shape;
    determining properties of the detected geometric shape and properties of the portion of the user readable content of the electronic document, wherein the determined properties of the detected geometric shape include a first size and a position of the detected geometric shape on the electronic document, t and the determined properties of the portion of the user readable content include an angle of rotation of the portion of the user readable content;

encoding the portion of the user readable content into the machine readable content; and generating barcode printing instructions based on the machine readable content, wherein the barcode printing instructions include instructions for a printer to print the electronic document after replacing the portion of the user readable content with the machine readable content based on the determined properties of the detected geometric shape and the determined properties of the portion of the user readable content of the electronic document, wherein the machine readable content is instructed to be a second size that is the largest size, within the first size, supported by the printer and further instructed to be at the position of the detected geometric shape, and if the second size is smaller than the first size, the machine readable content is instructed to be centered with respect to the detected geometric shape both vertically and horizontally, and wherein the machine readable content is instructed to be printed to have the angle of rotation of the portion of the user readable content.

5. A non-transitory computer-readable medium storing program code that, when executed by one or more processors, causes the one or more processors to:

retrieve an electronic document that includes user readable content;

detect a geometric shape of a particular color included in the electronic document;

detect a portion of the user readable content of the electronic document provided within the detected geometric shape;

determine properties of the detected geometric shape and properties of the portion of the user readable content of the electronic document, wherein the determined properties of the detected geometric shape include a first size and a position of the detected geometric shape on the electronic document, and the determined properties of the portion of the user readable content include an angle of rotation of the portion of the user readable content;

encode the portion of the user readable content into machine readable content; and generate barcode printing instructions based on the machine readable content, wherein the barcode printing instructions include instructions for a printer to print the electronic document after replacing the portion of the user readable content with the machine readable content based on the determined properties of the detected geometric shape and the determined properties of the portion of the user readable content of the electronic document, wherein the machine readable content is instructed to be a second size that is the largest size, within the first size, supported by the printer and further instructed to be at the position of the detected geometric shape, and if the second size is smaller than the first size, the machine readable content is instructed to be centered with respect to the detected geometric shape both vertically and horizontally, and wherein the machine readable content is instructed to be printed to have the angle of rotation of the portion of the user readable content.

* * * * *

UNITED STATES PATENT AND TRADEMARK OFFICE
CERTIFICATE OF CORRECTION

| | | |
|---|---|---|
| PATENT NO. | : 11,138,484 B2 | Page 1 of 1 |
| APPLICATION NO. | : 16/861635 | |
| DATED | : October 5, 2021 | |
| INVENTOR(S) | : David L. Geering | |

It is certified that error appears in the above-identified patent and that said Letters Patent is hereby corrected as shown below:

In the Claims

In Column 12, Line 67, replace ", t and" with --, and--.

Signed and Sealed this
Twenty-fifth Day of October, 2022

*Katherine Kelly Vidal*

Katherine Kelly Vidal
*Director of the United States Patent and Trademark Office*